United States Patent [19]

Auvert et al.

[11] Patent Number: 4,825,034

[45] Date of Patent: Apr. 25, 1989

[54] MICROBEAM LASER MACHINE FOR ACTING ON OBJECTS HAVING THIN LAYERS OF MATERIAL

[75] Inventors: Geoffroy Auvert, Grenoble; Jean-Claude Georgel, Lambesc; Yves Guern, Saint Maximin, all of France

[73] Assignee: Etat Francais (Centre National d'Etudes des Telecommunication), Issy-les-Moulineaux, France

[21] Appl. No.: 136,349

[22] Filed: Dec. 22, 1987

[30] Foreign Application Priority Data

Dec. 23, 1986 [FR] France .................. 86 18079

[51] Int. Cl.4 ............................................. B23K 26/00
[52] U.S. Cl. ............................ 219/121.72; 219/121.74; 219/121.75; 219/121.83

[58] Field of Search ........ 219/121 L, 121 A, 121 LB, 219/121 LU, 121 LV, 121 LG, 121 LN, 121 LC, 121 LD, 121 LM, 121 LR, 121.6, 121.61, 121.62, 121.72, 121.67, 121.63, 121.64, 121.85, 121.78, 121.79, 121.74, 121.83

[56] References Cited

U.S. PATENT DOCUMENTS

| 3,192,318 | 6/1965 | Schleich | 219/121 LB X |
| 3,769,663 | 11/1973 | Goldman | 219/121 LN X |
| 3,782,823 | 1/1974 | Kantorski et al. | 216/121 LB X |
| 4,330,208 | 5/1982 | Eloy | 356/318 |

Primary Examiner—C. L. Albritton
Attorney, Agent, or Firm—Dennison, Meserole, Pollack & Scheiner

[57] ABSTRACT

A microbeam laser machine for operating on objects having thin layers comprises a platen (14) which is rigid and undeformable and which has optical components mounted thereon defining a laser beam transmission path (34, 36, 38, 46), an illumination path (54, 55, 46), and an observation path (70, 74, 76). The invention is intended, in particular, for microoperations on integrated circuits and other objects having thin layers.

19 Claims, 4 Drawing Sheets

MICROBEAM LASER MACHINE FOR ACTING ON OBJECTS HAVING THIN LAYERS OF MATERIAL

The invention relates to a microbeam laser machine for acting on objects having thin layers of material, for example for cutting them.

BACKGROUND OF THE INVENTION

Machines of this type are already known and they generally use a pulse laser. These machines are difficult to use for acting on integrated circuits and on thin layers, for example magnetic layers formed on the magnetic heads of video recorders or of computer disk drives, since the time intervals between the laser pulses allow the layer of material being acted on to cool down and therefore do not provide advantageous speed of execution or fineness of cut.

Proposals have already been made to use continuous laser machines of the type using an argon laser which is coupled to an optical circuit including a microscope for focusing the laser beam to a diameter of about one micrometer on the surface of the object to be treated. However, this is a laboratory instrument which requires extremely fine and delicate adjustment and it is not suitable for industrial use.

The invention seeks to provide a microbeam laser machine for acting on objects having thin layers of material, which machine is suitable for industrial use, is capable of being automated, and makes it possible to accurately observe the action of the laser microbeam on objects being treated.

The invention also seeks to provide a machine of this type which is capable of being used not only for accurate operations on integrated circuits, e.g. for correcting microdefects, but also for microanalysing, for repairing, and for reconfiguring integrated circuits and various other objects having thin layers of material, as used in microelectronics, for example.

SUMMARY OF THE INVENTION

To this end, the invention provides a microbeam laser machine for acting on objects having thin layers of material, for example for cutting said layers, the machine comprising a continuous laser, coupled to a microscope for focusing the laser beam on a particular point of the object and for observing the point of impact of the laser beam on the object, the machine being characterized in that it comprises a platen which is rigid, undeformable, and insensitive to vibration, said platen being placed at the outlet from the laser and having removably fixed thereon at least one microscope objective lens and optical components for defining three optical paths which are independent from one another and which include independent adjustment means, said three optical paths comprising a path leading to the object for transmitting the laser beam to the microscope objective lens, a path for transmitting an illumination beam towards the microscope objective lens, and a display path connecting the microscope objective lens to electronic means for displaying the zone of the object to be treated together with the point of impact of the laser beam on said zone.

It is thus possible, by virtue of these three independent optical paths and their adjustment means, to treat a thin layer of material on an object with a laser beam whose diameter on the surface of the object is of the order of a micrometer, while simultaneously continuously observing the action of the laser beam on the surface of the object being treated without danger for the purpose of guiding the displacement of said beam over the entire operation zone.

According to another characteristic of the invention, the said platen includes mechanical means for accurately positioning the optical components, enabling the components to be removed and replaced without changing the optical adjustments.

It is thus possible to adapt the machine to a given type of operation very easily and without wasting time.

According to yet another characteristic of the invention, the observation path of the platen comprises a C.C.D. type matrix camera whose output is connected to a display screen which is independent from the platen and whose inlet is connected to the microscope objective lens via filters for attenuating the image of the point of impact of the laser beam, and via optical means for magnifying the image.

Personnel can thus continuously observe the objects being treated and the real impact of the laser beam. Further, the laser beam can be positioned on the objects to be treated with an accuracy of about 0.2 micrometers.

According to another characteristic of the invention, the laser beam transmission path comprises a first reflector followed by an afocal optical device for magnifying the laser beam, a dichroic plate through which the laser beam passes, and serving to separate the laser beam transmission path from the illumination path and the observation path, and a reflector leading to the microscope objective lens.

The first reflector is optically conjugated with the entrance pupil of the microscope objective lens. Adjusting it therefore has no influence on the position of the laser beam relative to the center of the pupil but only to the position of the point of impact of the focused laser beam on the object to be treated.

Advantageously, this first mirror is motorized, for example in order to scan the point of impact of the laser beam over the surface of the object.

According to another characteristic of the invention, this path for transmitting the laser beam over the platen is connected to the laser outlet via another reflector and an optical insulator for preventing the laser beam being reinjected back into the laser outlet.

The surface of the object to be treated may include a highly reflective layer, e.g. of aluminum. The optical isolator which prevents the reflected laser beam from being reinjected therefore prevents the laser from becoming destabilized.

Advantageously, the reflector associated with the optical isolator is optically conjugated with the aiming zone on the object in order to enable the impact of the laser beam to be adjusted to the center of the microscope entrance pupil.

The adjustment of the point of impact of the laser beam on the surface of the object to be treated and the adjustment of the point of impact of the laser beam on the inlet pupil of the microscope objective lens are thus made independent from each other.

According to another characteristic of the invention, the illumination path on the platen comprises a bundle of optical fibers having one end connected to a light source which is external to the platen and having its other end optically conjugated with the entrace pupil of the microscope objective lens, and a semi-transparent plate serving to reflect the light beam leaving the optical fibers towards the dichroic plate through which the laser beam passes.

The dichroic plate in the laser beam transmission path through which the laser beam passes and which serves to reflect the illuminating light beam, thus serves as an interface between the laser beam path and the illuminating path.

Advantageously, the above-mentioned semi-transparent plate is located at the entrance to the observation path and passes the laser beam as reflected from the object on its way towards the C.C.D. matrix camera of the observation path.

The invention also provides for the object to be treated being mounted on a support which is associated with means for displacement in three mutually perpendicular directions, two of which are parallel to the platen, with the object support being rotatable about its displacement axis which is perpendicular to the platen.

In a preferred embodiment of the invention, the object support is displaced in the two directions parallel to the platen by stepper electric motors, while the means for displacing the support in the third direction comprise manual adjustment means, together with piezoelectric motors for providing fine adjustment of the position of the objects to be treated.

These various drive means may be automatically controlled by a microprocessor if repetitive operations are to be performed on identical objects.

BRIEF DESCRIPTION OF THE DRAWINGS

An embodiment of the invention is described by way of example with reference to the accompanying drawings, in which.

MORE DETAILED DESCRIPTION

Figure 1:
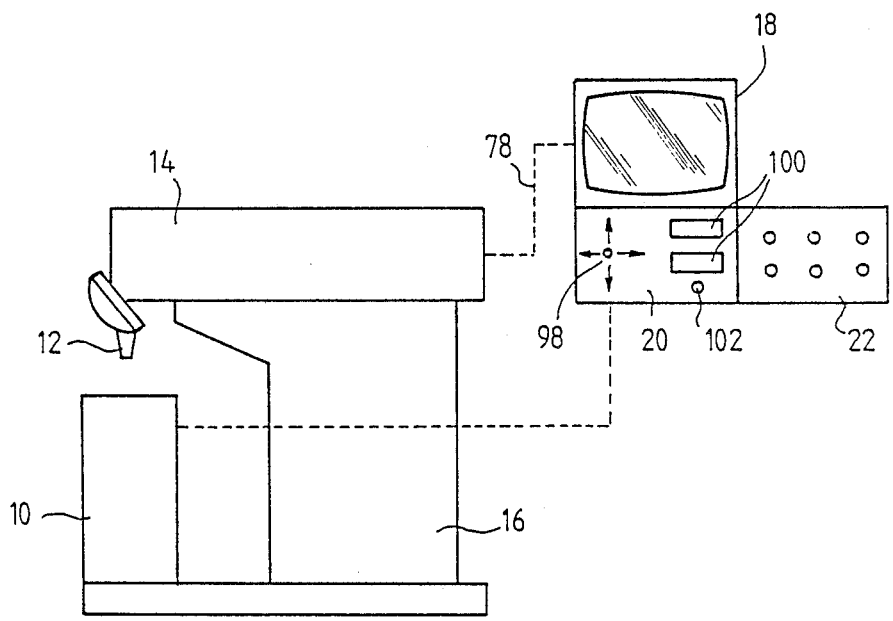
FIG. 1 is a diagrammatic view of a machine in accordance with the invention.

As can be seen diagrammatically in FIG. 1, a machine in accordance with the invention comprises: a support 10 for the object to be treated, e.g. an integrated circuit; the objective lens 12 of a microscope pointing thereto; a platen 14 carrying said lens, said platen being rigid, undeformable, and insensitive to vibrations, and being horizontally disposed for example; a metal frame 16 supporting said platen; a display screen 18 connected to the outlet from the observation path carried by the platen 14; a control panel 20 for adjusting laser beam focusing on the objects to be treated and for controlling displacements of the object support; and a control panel 22 including various control means and laser-adjustment means.

Figure 2:
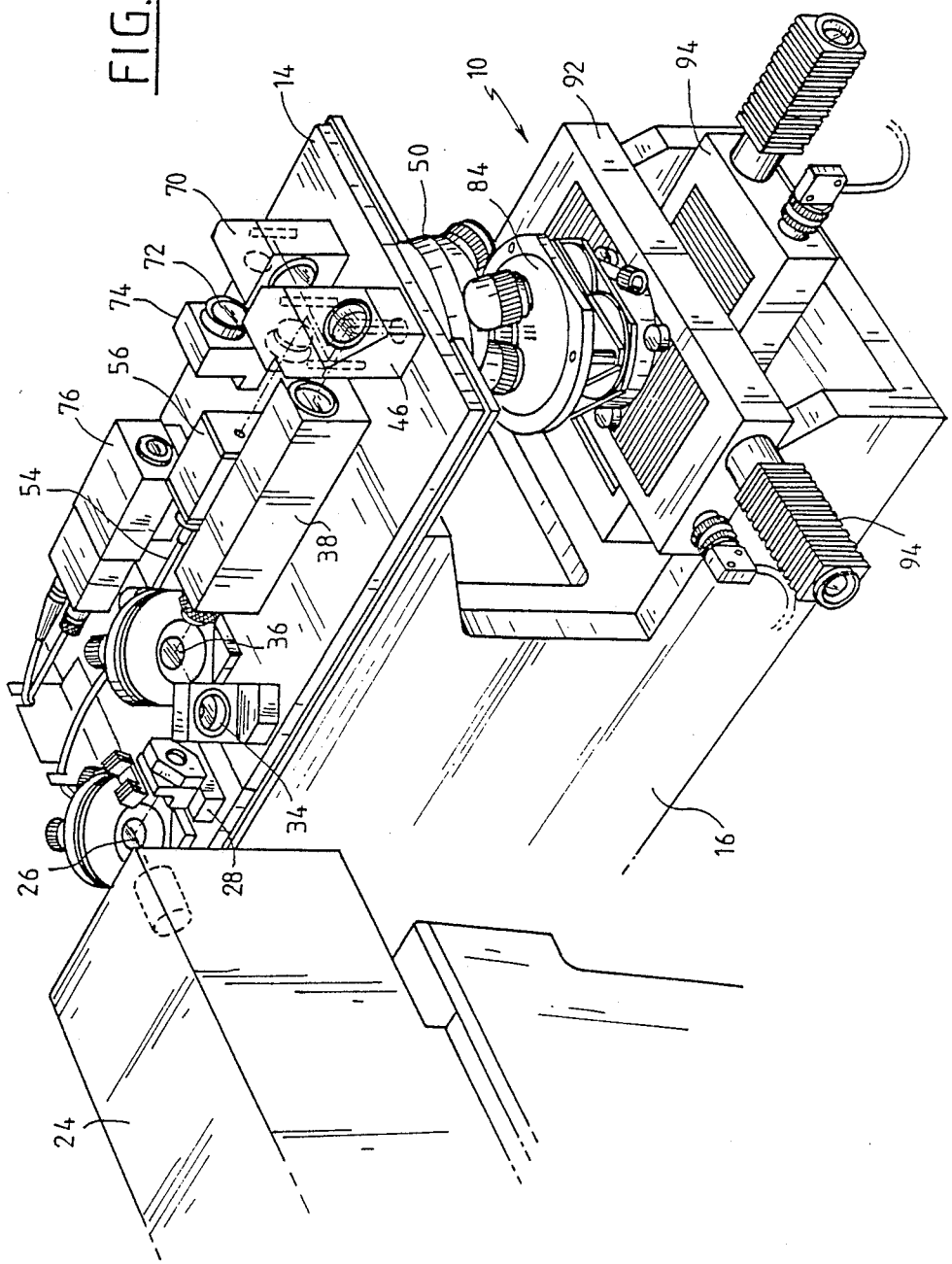
FIG. 2 is a diagrammatic fragmentary perspective view of said machine.
Figure 3:
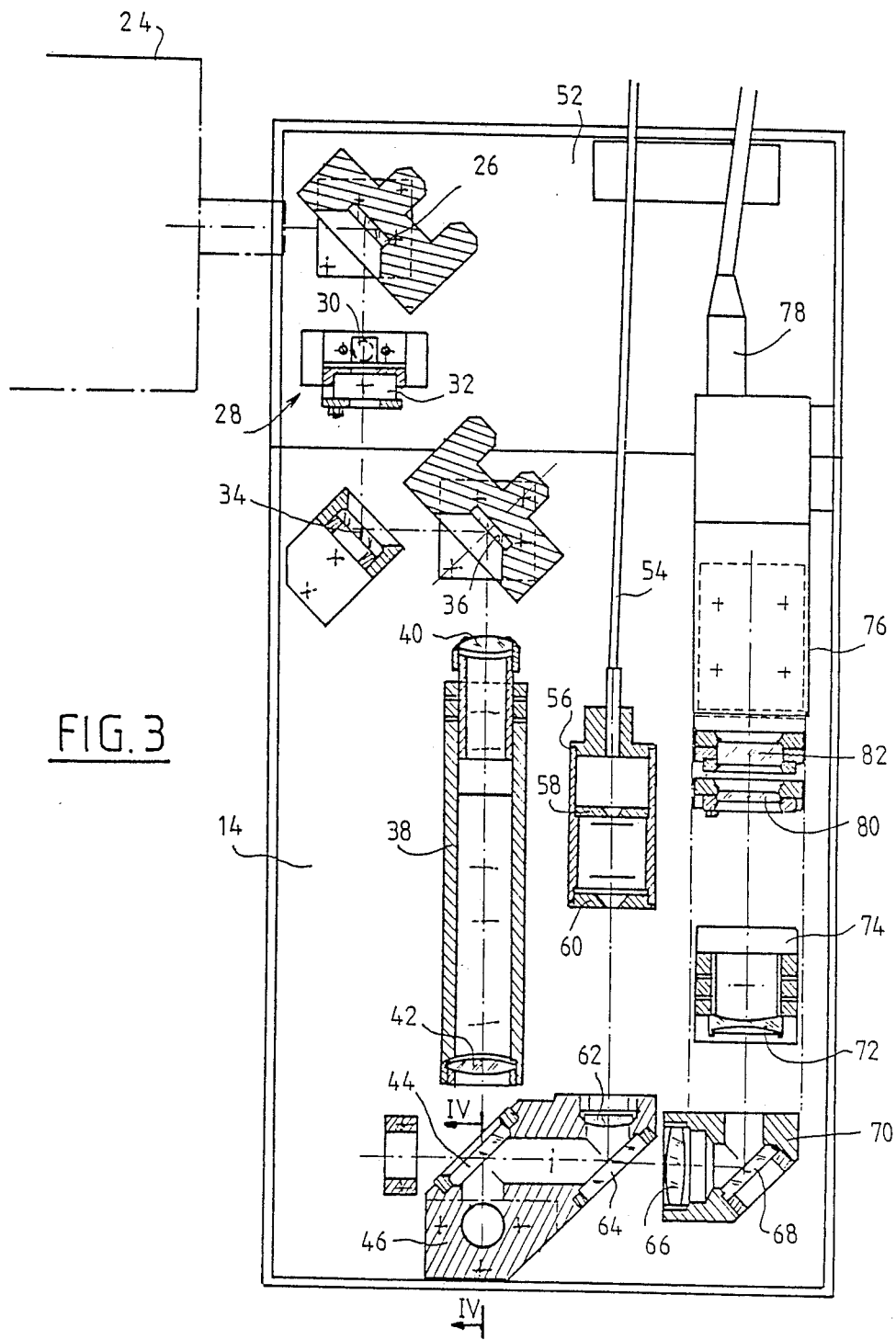
FIG. 3 is a plan view of the optical platen of the machine.

The laser 24, of which only a portion is shown in FIGS. 2 and 3, is a continuous argon laser, having a multiline optical power of several watts and a spectrum band from about 450 nm to about 525 nm.

The emitted laser beam encounters a first reflector 26 which reflects the laser beam at right angles towards an optical isolator 28 comprising a polarizing cube 30 and a quarterwave plate 32 which prevents laser energy from being reinjected into the emit cavity from the laser 24 when the point of impact of the laser beam moves onto a highly reflecting portion of the surface of objects being treated, e.g. an aluminum portion. This prevents the laser 24 from becoming destabilized.

At the outlet from the optical isolator 28, the laser beam encounters another fixed reflector 34 which reflects the laser beam at right angles towards a reflector 36 which reflects the laser beam at right angles towards an afocal magnifying device 38 including an inlet lens 40 which is movable in translation in order to focus the laser beam and an outlet lens 42. The device 38 expands the laser beam with a linear magnification ratio of about three, for example, which is compatible with the entrance pupil diameter of the objective lens 12 of the microscope. Thus, the laser beam has a diameter at the outlet from the device 38 which corresponds substantially to the entrance pupil of the objective lens 12, thereby ensuring that the laser beam is not masked by the lens 12 which would give rise to a loss of energy and is not concentrated on a small area of the microscope entrance pupil which could run the risk of damaging the lenses in the microscope.

Further, this afocal magnifying device 38 also makes it possible to compensate for divergence in the laser beam so as to work with parallel light.

The parallel laser beam leaving the device 38 passes through a dichroic plate 44 which is at an angle of 45° and is mounted on a block 46 on which a reflector 48 is also mounted, which mirror reflects the laser beam through a right angle towards the entrance pupil of the microscope objective lens 12 pointing towards the support 10 for supporting an object to be treated. The microscope lens 12 is mounted on a rotary turret 50 having a plurality of lenses giving different magnifications.

As mentioned above, the reflector 26 is optically conjugated with the area of the objects to be treated and makes it possible by rotation through two angles to return the laser beam and to adjust its impact to the center of the entrance pupil of the microscope lens 12, while the reflector 36 is optically conjugated via the device 38 with the entrance pupil to the microscope lens 12 in such a manner that adjusting it does not affect the position of the laser beam impact relative to the center of the entrance pupil of the lens 12, but only the position of the point of impact of the focused laser beam on the object to be treated. These two adjustments are thus rendered independent from each other. Further, the mirror 36 may be associated with drive means should it be necessary to scan the point of impact of the laser beam over the surface of the object to be treated.

Preferably, the first reflector 26 and the optical isolator 28 are mounted on a plate 52 which is not fixed to the platen 14 carrying the reflectors 34 and 36, the afocal device 38, and the block 46 on which the turret 50 carrying the microscope lenses is mounted. The microscope can thus be rendered movable relative to the laser. The platen 14 is associated with shock absorbing devices for filtering any vibrations that may be transmitted to the platen, for example vibrations caused by the water cooling circuit for the laser 24.

The various optical means mentioned above constitute the path for transmitting the laser beam over the platen 14.

The platen also includes an illumination path comprising an optical fiber bundle 54 having one end connected to any suitable type of illumination source, e.g. an incandescent lamp, external to the platen 14 and the plat 52, and having its other end connected to a device 56 mounted on the platen 14 and including a plate 58 having a central orifice through which the light beam leaving the optical fibers 54 passes, thereby limiting interfering light, and a field diaphragm 60 which is optically conjugated with the surface of the object to be treated.

The stopped-down light beam leaving the device 56 passes firstly through an optical doublet 62 carried on the above-mentioned block 46, is then reflected through a right angle on a semi-transparent plate 64 towards the dichroic plate 44, and is finally reflected by said plate 44 onto the above-mentioned reflector 48.

The end of the bundle of optical fibers 54, the device 56, the doublet 62, the semi-transparent plate 64, the dichroic plate 44, and the reflector 48 associated with the microscope objective lens 12 together constitute the path on the platen 14 for illuminating the object to be treated.

An observation path which is independent from the two above-described paths is provided on the platen 14 and comprises, in addition to the microscope objective lens 12, the mirror 48 and the dichroic plate 44, and the semi-transparent plate 64 through which the light beam passes, a compact teleobjective comprising converging lens 66 and a reflector 68 carried by a block 70 and a diverging lens 72 carried by another block 74 and pointing towards the lens of a C.C.D. matrix camera 76 (i.e. a Charge Coupled Device) fixed on the platen 14 and having its outlet 78 connected to the display screen 18.

Optical filters 80 and 82 are interposed between the inlet to the camera 76 and the outlet from the teleobjective in order to attenuate the image of the impact of the laser beam on the objects to be treated and to enable the camera 76 and the screen 18 to display both the surface of the object to be treated and the impact of the laser on said surface.

A prism may also be placed on the display path of the platen 14 between the optical fiber 18 and the outlet from the teleobjective in order to modify the direction of image displacement on the display screen 18.

The various optical components mounted on the platen 14 are removably mounted thereon by screws and are associated with very accurate mechanical positioning means, for example pegs carried by the platen 14 and received in cavities in the component supports, thereby enabling the components to be removed and replaced without it being necessary to perform new optical adjustments. The illumination path on the platen 14 has the advantage of taking up little room. The source of illumination light is external to the platen 14 and therefore has no thermal influence on the optical components mounted thereon, and it may be changed without it being necessary to perform new optical adjustments. The entire field of observation on the surface of the objects to be treated is thus uniformly illuminated.

Figure 4:
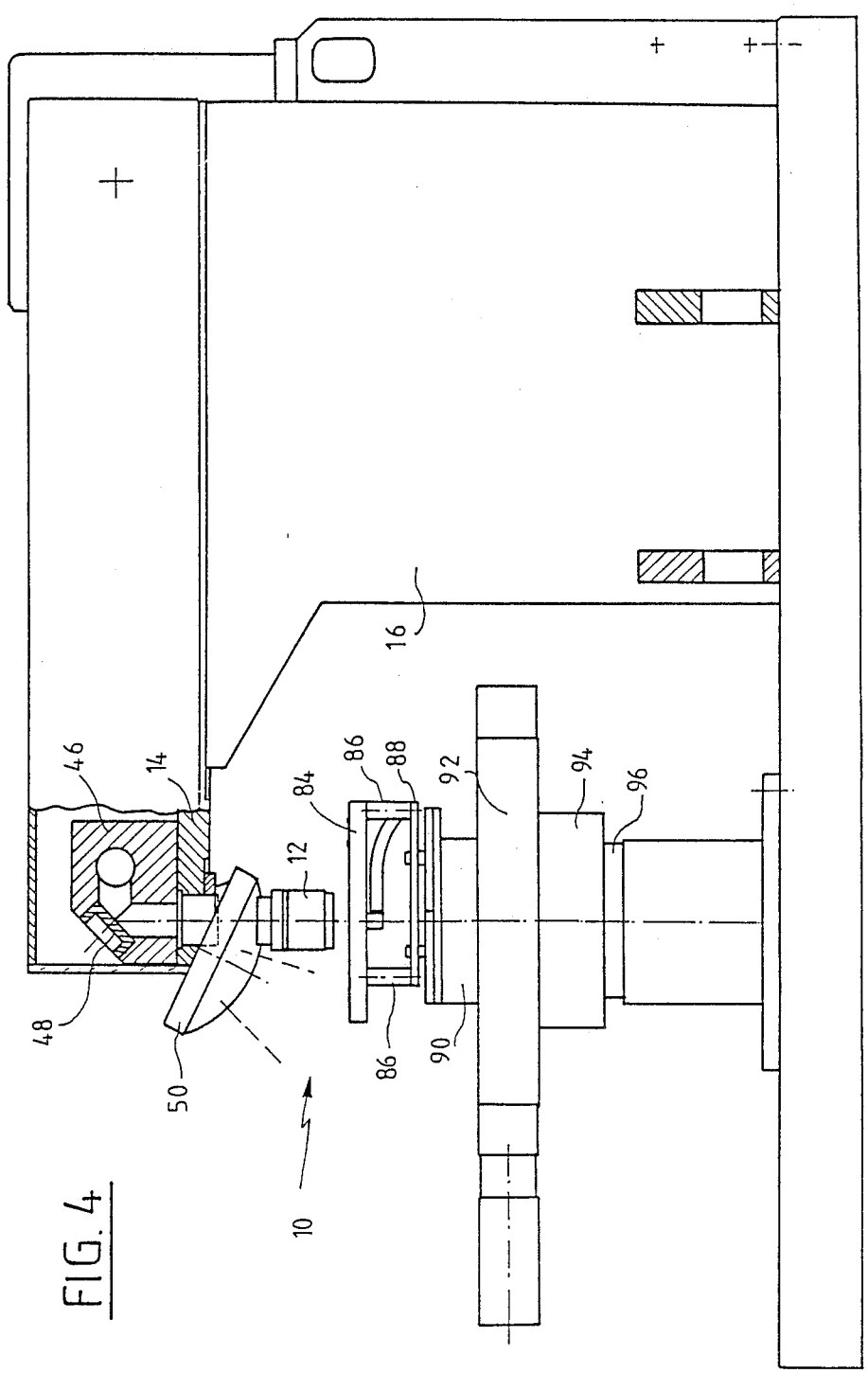
FIG. 4 is a diagrammatic fragmentary section on line IVIV of FIG. 3.

The support 10 for supporting the objects to be treated includes (see FIGS. 2 and 4) a top plate 84 on which the object to be treated is held by suction.

The top plate 84 is connected by vertical risers 86 to a bottom plate 88 which is associated with piezoelectric motors enabling fine focusing 88 and 84, e.g. over a stroke of 100 microns to an accuracy of 0.1 microns.

The plate assembly 84 and 88 is carried by a turntable 90 which is capable of being rotated about the vertical axis under manual or motor control in order to orient the surface of the object to be treated relative to the two axes of perpendicular horizontal displacement. The turntable 90 is itself carried on a first linear displacement table 92 movable along a first horizontal axis by an electric stepper motor, with said first table 92 being itself carried by a second linear displacement table 94 displaceable in translation along a horizontal axis which is perpendicular to the first axis by means of another electric stepper motor. These two motors have a stroke of 100 mm or 150 mm with a minimum displacement of 0.1 micrometers, for example.

The table assembly 92 and 94 is carried on a column 96 which is vertically displaceable under manual control for coarse focusing adjustment with an accuracy of 1 micrometer over a stroke of about 12 mm to 15 mm.

The electric stepper motors for displacing the tables 92 and 94 may be controlled from the control panel 20 (see FIG. 1) for example by means of a joystick 98 capable of being displaced in two perpendicular directions corresponding to the directions in which the tables 92 and 94 can be displaced. The panel 20 also includes means 100 for displaying the coordinates along these two axes of a point on the surface of the object to be treated, together with a rotary knob 102 for controlling the fine focusing adjustment piezoelectric motors.

The machine in accordance with the invention operates as follows.

The object to be treated is placed on the top plate 84 of the support 10 and is held in place by suction, thereby making it possible, inter alia, to at least partially correct planeness defects in the thin layer supports. A magnification suitable for the intended operation is selected by rotating the turret 50 to select an appropriate lens 12.

The particular zone on the surface of the object that is to be treated is then looked for on the display screen 18 with the illumination path and the observation path both being in operation. When the microscope lens 12 provides a magnification of 50, the diagonal of the field of observation on the surface of the object to be treated is 135 micrometers, whereas the magnification of the image on the display screen 18 is 2,000 times.

Cross-wires 20 may be provided in the illumination path in a slightly out-of-focus position so as to show up the optical axis on the image while still making it possible to see what lies behind the cross-wires. When the optical axis is properly positioned over the surface of the object to be treated, for example over the ledge of a thin layer to be cut, the laser 24 is switched on to produce relatively high power laser beam (1 to 2 watts) for a duration limited to about 1 second, for example, in order to initiate a thermal chemical reaction between the thin layer to be cut and the underlying layer. The power of the laser beam is then reduced and the point of impact of the laser beam is caused to move to provide the desired cut by suitably controlling the electric motors for displacing one or other of the tables 92 and 94.

The diameter of the point of impact of the laser beam on the surface of the objects to be treated is not more than about 1 micrometer when using an objective lens having a magnification of 50. The depth of the field is about ±0.5 micrometers, with the working gap between the end of the microscope objective 12 and the surface of the object to be treated being about 8 mm.

It is also possible to use a microscope objective lens having a larger magnification, for example 100. In this case, the diameter of the focus laser beam is less than 1 micrometer, the depth of the field is ±0.2 micrometers, and the operating gap between the end of the lens and the surface of the object to be treated is about 0.3 mm.

The magnification obtained in the image on the display screen 18 is then about 4,000.

The machine in accordance with the invention can thus provide fine cuts in the connections of an integrated circuit, for example to correct microdefects or short circuits. It may also cut through a layer of metallization around a contact hole and it can also be used to detect and locate sensitive points in a circuit which is powered at close to its marginal voltage by scanning the circuit with the laser beam. The excitation of critical points in the circuit may give rise to detectable logic errors, thereby enabling said sensitive points to be located.

This machine may also be used for microchemical operations by virtue of the local reactions which the laser beam induces.

In the example described, the platen 14 carrying the major portion of the optical components of the machine is fixed while the support for the object to be treated is moving. Nevertheless, the platen could be a moving platen if so required.

For repetitive tasks, a microprocessor may be coupled to the machine for automatically controlling the displacements of the object to be treated relative to the selected microscope lens in accordance with a predetermined sequence, and also to adjust the power level of the laser. A conventional type of automatic focusing device may also be used to continuously adjust laser beam focusing on the surface of the object to be treated, thereby correcting focusing defects caused, for example, by movement of the object to be treated, by planeness defects in its surface, etc.

We claim:

1. A microbeam laser machine for acting on objects having thin layers of materials, such as integrated circuits, for example for cutting said layers, the machine comprising a continuous laser, a microscope for focusing the laser beam on a particular point of the object and for observing the point of impact of the laser beam on the object, and a rigid platen, indeformable, and insensitive to vibrations, said platen being located between the outlet from the laser and the object and having removably fixed thereon the microscope and optical components for defining three optical paths including independent adjustment means and comprising:
   a laser beam transmission path extending from the outlet of the laser towards the object through the microscope;
   an illumination path for transmitting an illumination beam towards the object through the microscope; and
   a video observation path extending from the object towards electronic means and a video display screen through the microscope,
   said three optical paths being independent from one another on said platen upstream of the microscope and being permanently gathered by means of a dichroic plate at the inlet of the microscope, to permit to continuously observe the action of the laser bean on the object.

2. A machine according to claim 1, wherein the platen includes mechanical means for accurately positioning the optical components, enabling the components to be removed and replaced without changing the optical adjustments.

3. A machine according to claim 1, wherein the observation path of the platen includes a C.C.D. type matrix camera whose output is connected to a display screen which is independent from the platen and whose inlet is connected to the microscope objective lens via filters for attenuating the image of the point of impact of the laser beam, and via optical means for magnifying the image.

4. A machine according to claim 1, wherein the laser beam transmission path comprises a first reflector followed by an optical device for magnifying the laser bean, the said dichroic plate through which the laser beam passes towards the microscope, and a reflector leading to the microscope objective lens.

5. A machine according to claim 4, wherein the first reflector is optically conjugated with the entrance pupil to the microscope objective lens.

6. A machine according to claim 4, wherein the first reflector is motorized, for example to scan the point of impact of the laser beam over the object.

7. A machine according to claim 4, wherein the transmission path is connected to the outlet from the laser by another reflector and by an optical isolator for preventing the laser beam from being reinjected back into the laser.

8. A machine according to claim 7, wherein said other reflector is optically conjugated with the target zone on the object, thereby enabling the point of impact of the laser beam to be adjusted to the center of the inlet pupil of the microscope.

9. A machine according to claim 7, wherein said other reflector and the optical isolator are mounted on a plate which is not fixed to said platen.

10. A machine according to claim 1, wherein the illumination path on the platen comprises a bundle of optical fibers having one end connected to a light source which is external to the platen and having its other end optically conjugated with the entrance pupil of the microscope objective lens, and a semi-transparent plate serving to reflect the light beam leaving the optical fibers towards a dichroic plate through which the laser beam passes.

11. A machine according to claim 10, wherein the semi-transparent palte is placed at the entrance to the observation path and has the reflected light beam passing therethrough which is directed towards the C.C.D. matrix camera.

12. A machine according to claim 1, wherein the object is mounted on a support having means for displacement in three perpendicular directions, two of which are parallel to the platen.

13. A machine according to claim 12, wherein the object support is rotatable about the displacement axis which is perpendicular to the platen.

14. A machine according to claim 12, wherein electric stepper motors are used to displace the object support in two directions parallel to the platen.

15. A machine according to claim 12, wherein the means for displacing the object support in the direction perpendicular to the platen comprise manual adjustment means and piezoelectric motors for fine position adjustment.

16. A machine according to claim 1, wherein it includes panels for controlling displacement of the objects to be treated, for displaying the controlled displacements, and for controlling laser operations.

17. A microbeam laser machine for acting on objects having thin layers of material, for example for cutting said layers, the machine comprising a continuous laser, coupled to a microscope for focusing the laser beam on a particular point of the object and for observing the point of impact of the laser beam on the object and a platen which is rigid, undeformable, and insensitive to vibration, said platen being placed at the outlet from the laser and having removably fixed thereon at least one microscope objective lens and optical components for defining three optical paths which are independent from on another and which include independent adjustment means, said three optical paths comprising;
- a path leading to the object for transmitting the laser beam to the microscope objective lens;
- a path for transmitting an illumination beam towards the microscope objective lens; and
- a display path connecting the microscope objective lens to electronic means for displaying the zone of the object to be treated together with the point of impact of the laser beam on said zone, and
- wherein the platen includes mechanical means for accurately positioning the optical components, enabling the components to be removed and replaced without changing the optical adjustments.

18. A microbeam laser machine for acting on objects having thin layers of material, for example for cutting said layers, the machine comprising a continuous laser, coupled to a microscope for focusing the laser beam on a particular point of the object and for observing the point of impact of the laser beam on the object and a platen which is rigid, undeformable, and insensitive to vibration, said platen being placed at the outlet from the laser and having removably fixed thereon at least one microscope objective lens and optical components for defining three optical paths which are independent from on another and which include independent adjustment means, said three optical paths comprising;
- a path leading to the object for transmitting the laser beam to the microscope objective lens;
- a path for transmitting an illumination beam towards the microscope objective lens; and
- a display path connecting the microscope objective lens to electronic means for displaying the zone of the object to be treated together with the point of impact of the laser beam on said zone,
- wherein the laser beam transmission path comprises a first reflector followed by an afocal optical device for magnifying the laser beam, a dichroic plate through which the laser beam passes, and serving to separate the laser beam transmission path from the illumination path and the observation path, and a reflector leading to the microscope objective lens, and
- wherein the first reflector is motorized, for example to scan the point of impact of the laser beam over the object.

19. A microbeam laser machine for acting on objects having thin layers of material, for example for cutting said layers, the machine comprising a continuous laser, coupled to a microscope for focusing the laser beam on a particular point of the object and for observing the point of impact of the laser beam on the object and a platen which is rigid, undeformable, and insensitive to vibration, said platen being placed at the outlet from the laser and having removably fixed thereon at least one microscope objective lens and optical components for defining three optical paths which are independent from on another and which include independent adjustment means, said three optical paths comprising;
- a path leading to the object for transmitting the laser beam to the microscope objective lens;
- a path for transmitting an illumination beam towards the microscope objective lens; and
- a display path connecting the microscope objective lens to electronic means for displaying the zone of the object to be treated together with the point of impact of the laser beam on said zone,
- wherein the object is mounted on a support having means for displacement in three perpendicular directions, two of which are parallel to the platen, and
- wherein the means for displacing the object support in the direction perpendicular to the platen comprise manual adjustment means and piezoelectric motors for fine position adjustment.

* * * * *